May 18, 1926.　　　　　R. W. FLETCHER　　　　　1,585,480

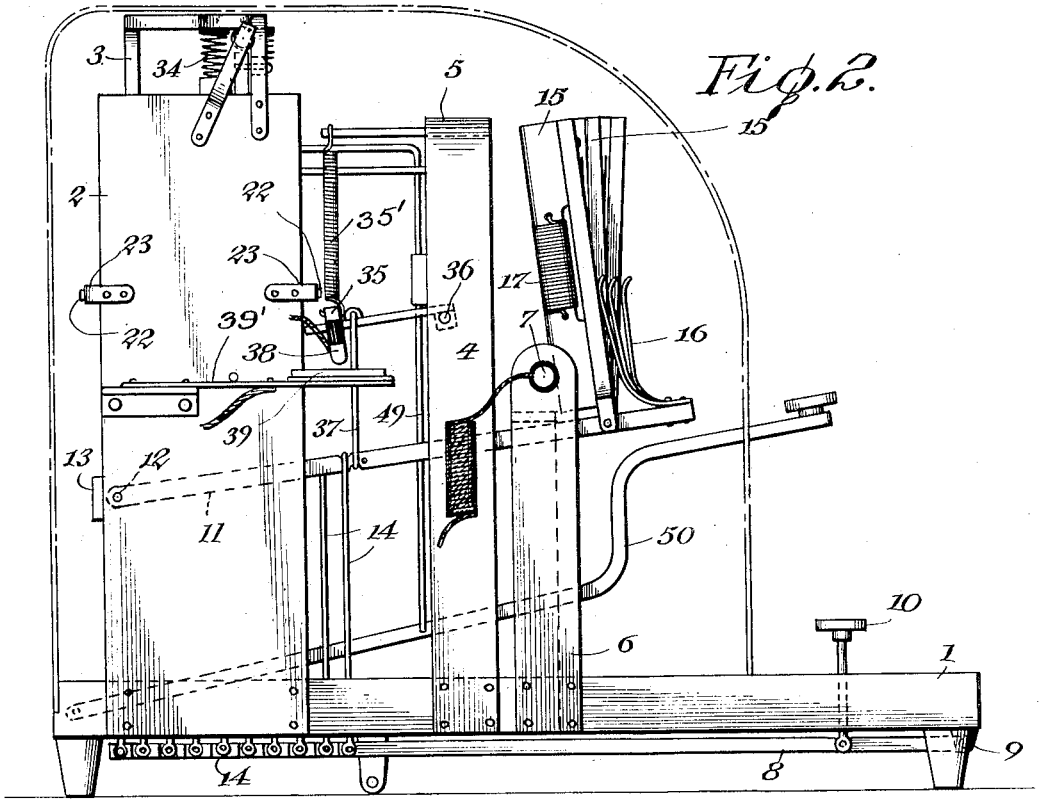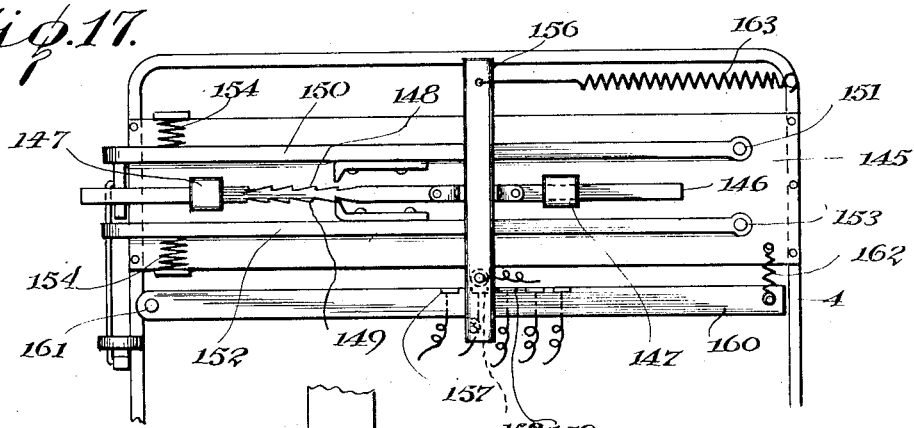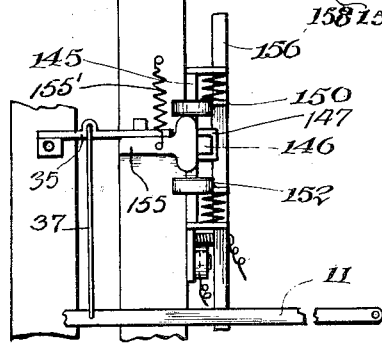

ADDING MACHINE

Filed July 8, 1922　　　8 Sheets-Sheet 3

Inventor
Roy W. Fletcher
By Vernon E. Hodges
His Attorney

May 18, 1926.

R. W. FLETCHER

ADDING MACHINE

Filed July 8, 1922  8 Sheets-Sheet 4

Inventor
Roy W. Fletcher
By Vernon E. Hodges
his Attorney

May 18, 1926.

R. W. FLETCHER

ADDING MACHINE

Filed July 8, 1922     8 Sheets-Sheet 6

1,585,480

Inventor
Roy W. Fletcher
by Vincent E. Hodges
his Attorney

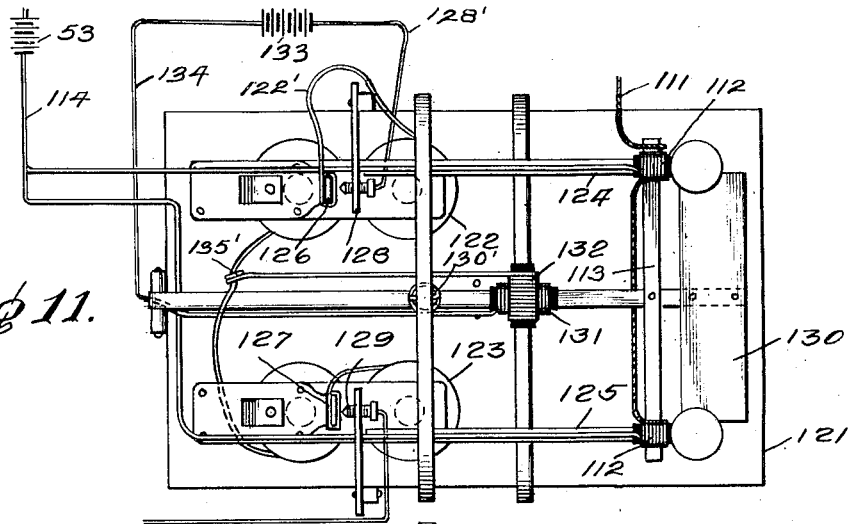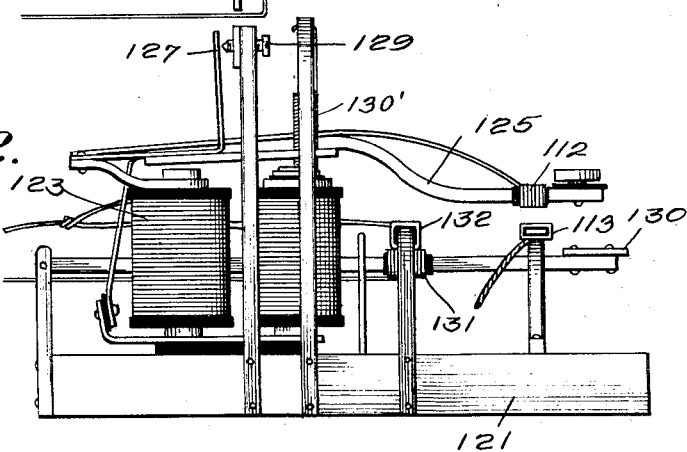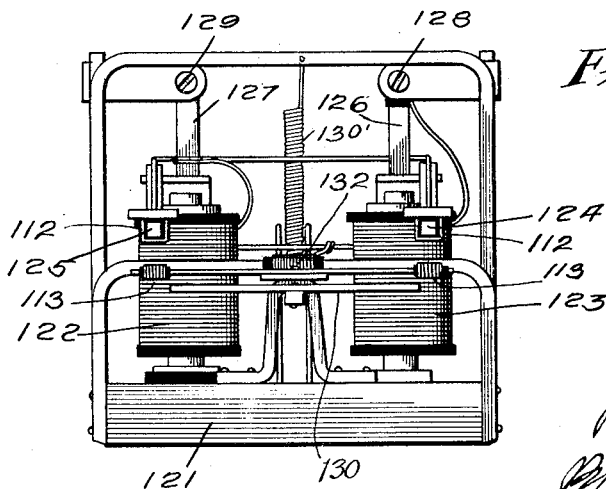

May 18, 1926.

R. W. FLETCHER

ADDING MACHINE

Filed July 8, 1922      8 Sheets-Sheet 8

1,585,480

Inventor
Roy W. Fletcher
By Vernon E. Hodges
his Attorney

Patented May 18, 1926.

1,585,480

UNITED STATES PATENT OFFICE.

ROY W. FLETCHER, OF SALT LAKE CITY, UTAH.

ADDING MACHINE.

Application filed July 8, 1922. Serial No. 573,598.

This invention relates to adding machines, the primary object being to collect and summarize amounts according to the grouping desired, using preferably a master keyboard connected electrically to a series of registering units.

A further object is to so arrange the several registering units that any particular one may be selected for a particular piece of work.

A further object is to so construct the device that a particular registering dial may be actuated independently for correcting a certain registration.

A further object is to so construct the device that the operator may subtract from the registered numerals, being limited, however, to the amount registered, In the accompanying drawings:

Fig. 2 is a side elevation of the registering keyboard;

Fig. 11 is a top plan view of the selecting switch; used in connection with selecting units;

Fig. 12 is a side elevation of the same;

Fig. 13 is a front elevation thereof;

Fig. 17 is a side view showing a modified form of a device for selecting a particular disk in a registering unit; and Fig. 18 is an end view thereof.

Figure 16:
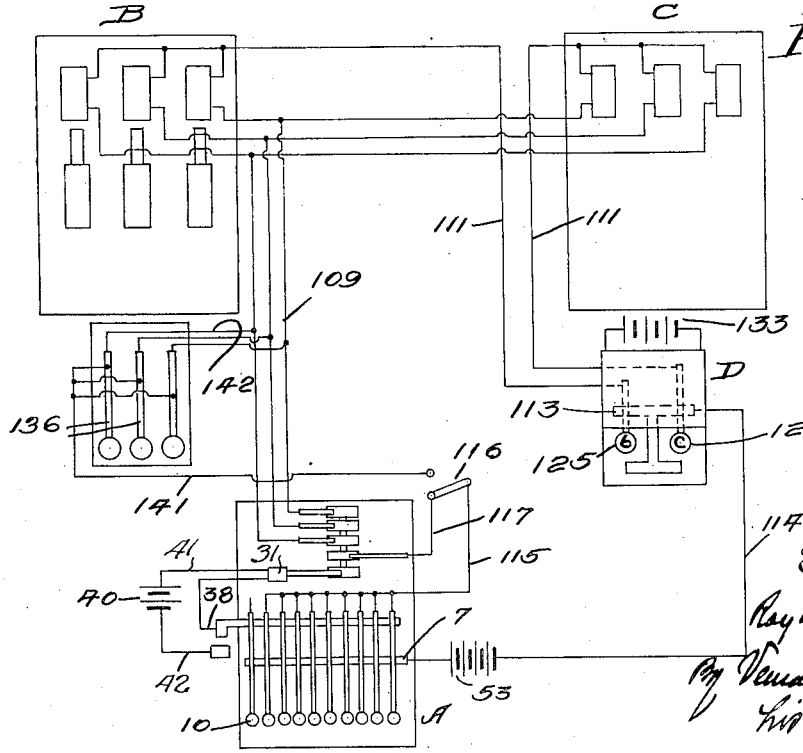
Fig. 16 is a diagram showing the arrange- of the several units.

As disclosed in Fig. 16 the device consists generally of a registering keyboard A, which acts as a master keyboard for actuating either of the registering units B or C, this being determined by the selecting switch D, by pressing either of the switches $b$ or $c$ completing the circuit between the master registering keyboard and the desired registering unit B or C.

As disclosed in Figs. 2 to 6, inclusive, the registering keyboard preferably consists of a base 1 provided at the rear with vertical uprights 2—2 connected together at their upper ends by a yoke 3. Arranged intermediate of the base is substantially U-shaped yoke consisting of upright members 4—4 and a horizontal member 5. Forward of the yoke are two uprights 6—6 adapted to support a horizontally arranged contact bar 7.

Figure 6:
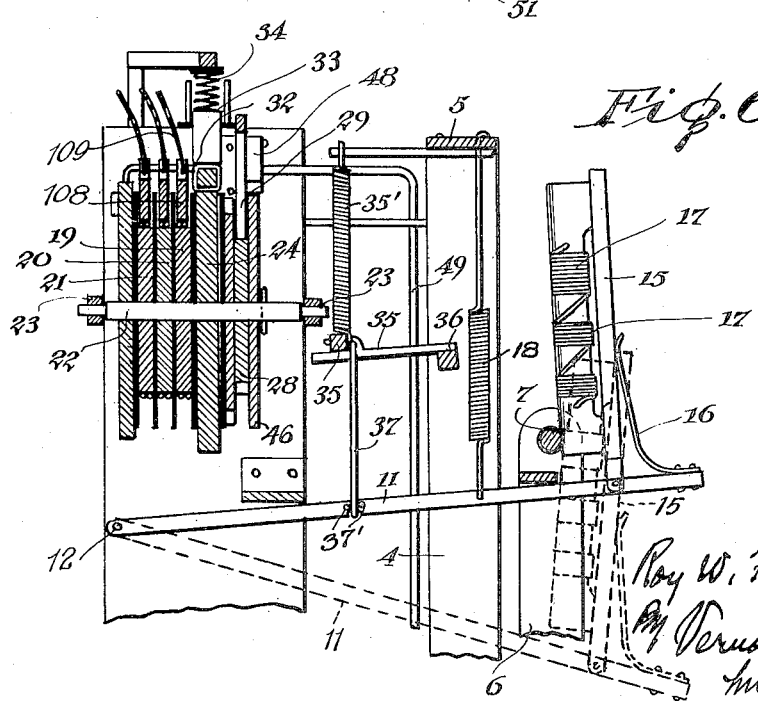
Fig. 6 is a longitudinal sectional view of the upper portion of the registering keyboard; and the assignment switch.
Figure 7:
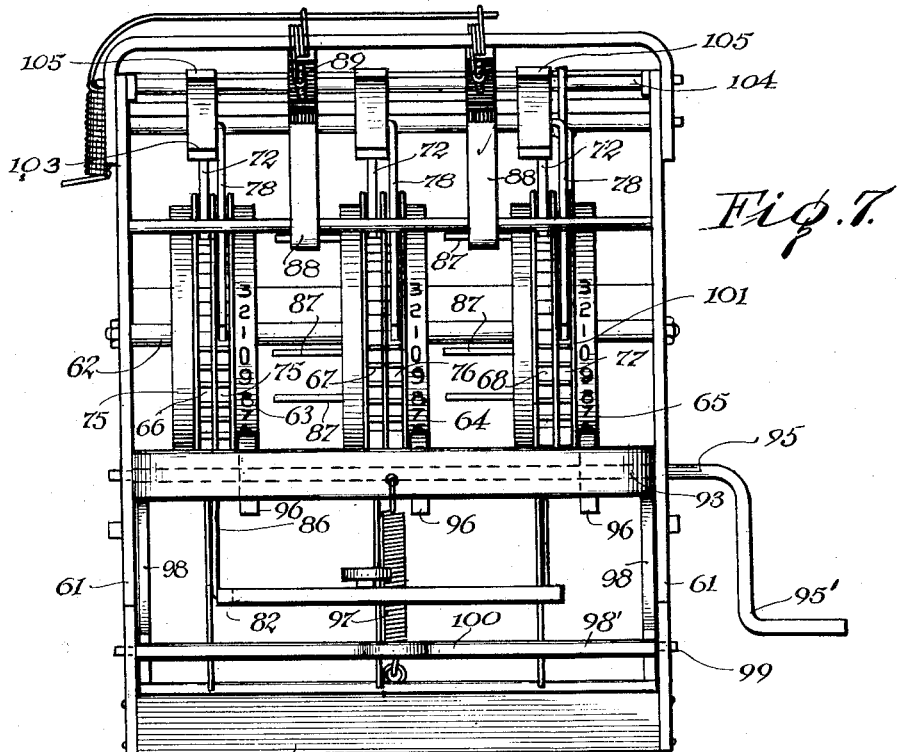
Fig. 7 is a front elevation of one of the registering devices.
Figure 8:
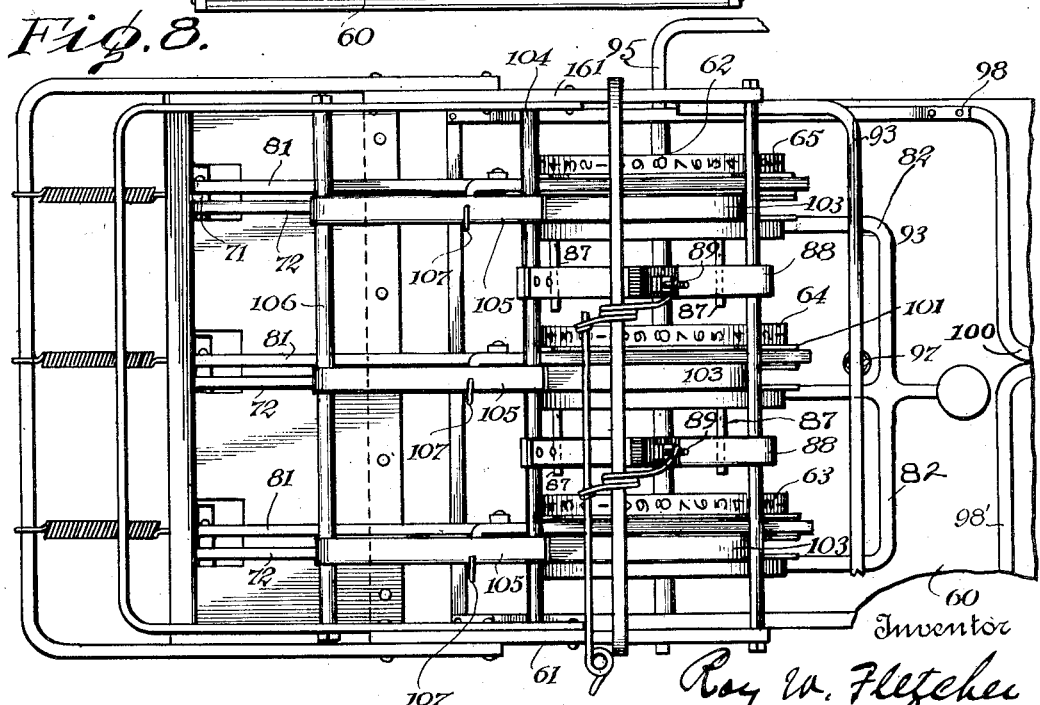
Fig. 8 is a top plan view thereof.
Figure 9:
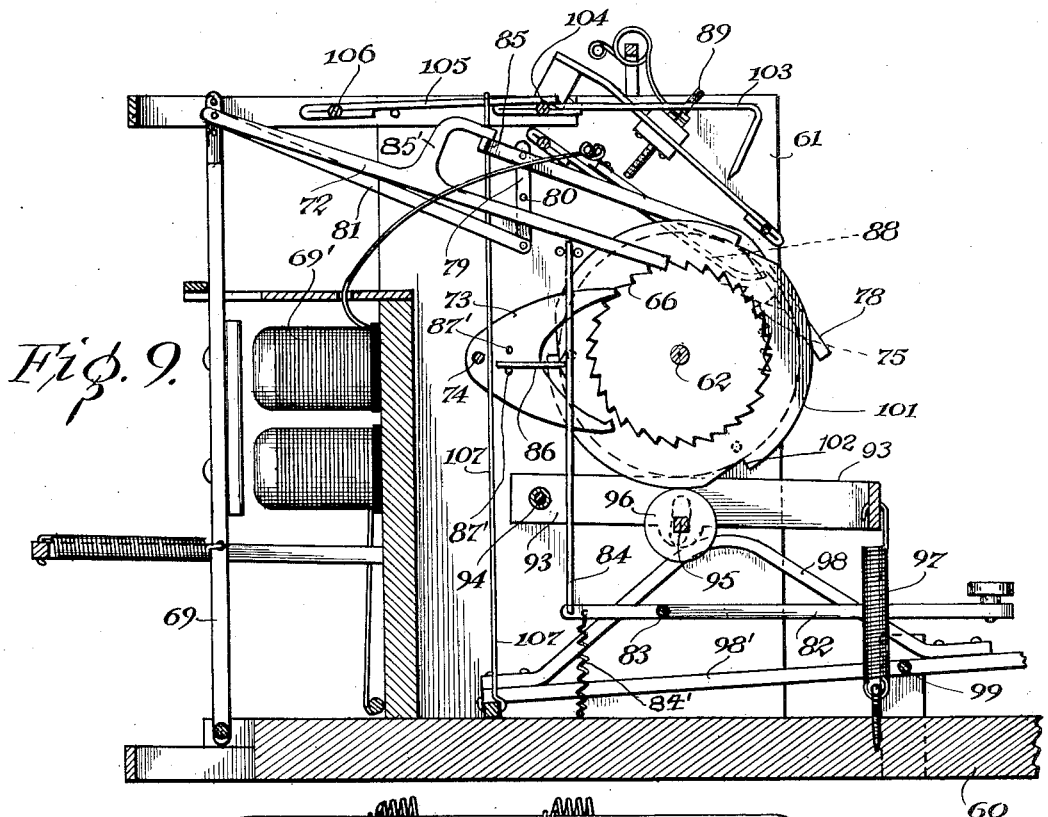
Fig. 9 is a longitudinal section through the registering unit.
Figure 10:
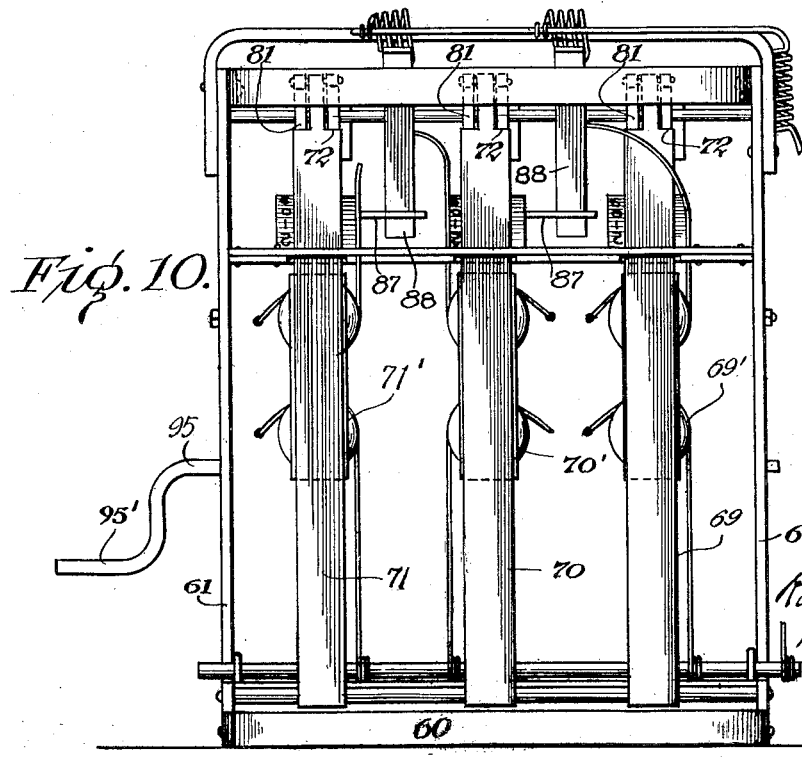
Fig. 10 is a rear view thereof.

The numeral 8 indicates a plurality of key levers pivoted as at 9 beneath the base 1 and extending rearwardly of the machine, said levers being actuated by suitable keys 10, these keys are tabulated from zero to nine, respectively. Arranged above the levers 8 are a plurality of auxiliary levers 11 pivoted at their rear ends on the rod 12 extending transversely in front of a transverse bar 13, these levers extend toward the front of the machine beneath the transverse bar 7 and are actuated by the key levers 8 being connected thereto by a plurality of links 14. These levers 11 are guided in their vertical movement by suitable guide members 11'. The auxiliary levers 11 from one to nine respectively have pivoted thereto contact fingers 15 which are adapted to bear against the transverse contact bar 7 being resiliently held against the transverse bar by springs 16. Each of these contact fingers 15 is provided with contact segments 17, these segments being so arranged as to cause the proper number of contacts to be made upon one complete movement of the auxiliary lever 11, as for instance the segment on the contact finger 15 corresponding to the key lever 8, designated as the key one, has a segment of sufficient length to make contact with the contact bar 7 and remain in contact during the down and up movement of the auxiliary lever 11, while the contact finger 15 corresponding to the key designated by the number nine has five segments 17 the uppermost segment being of sufficient length to contact with the contact bar 7 when the auxiliary lever 11 is in its lowermost position, remaining in contact therewith until the contact finger 15 starts on its upward movement, therefore there are five distinct contacts made on the downward movement and four on the upward movement making a total of nine contacts. It is understood that this form of contacts is carried out on each of the contact fingers 15 to effect the desired result when any one of the keys 10 is actuated. The auxiliary levers 11 are each held in their normal upper position by means of a plurality of springs 18, the outer ends of which are secured to the horizontal member 5 as shown in Fig. 6.

Arranged at the rear of the registering keyboard is an assignment switch preferably consisting of a plurality of contact disks 19, 20, 21 keyed to the shaft 22 journaled in suitable bearings 23—23. The numeral 24 indicates an assignment disk keyed to shaft 22, provided on its periphery with contact segments 25, 26, 27 which are connected to the contact disks 19, 20, 21, respectively. A toothed ratchet wheel 28 is keyed to the shaft 22 and is adapted to be engaged by ratchet pawl 29 carried by the armature 30 actuated by the electric magnets 31, the pawl 29 being held in its normal retarded position by a spring 31' and in contact with ratchet wheel 28 by spring 29' a spring pressed stop pawl 28' being provided to prevent possible backward movement. A contact finger 32 pivoted as at 33 to the main frame is adapted to register with the segments 25, 26, 27 of the assignment disk 24 as the latter is rotated being held in resilient contact therewith by a spring 34. It is desirable to rotate the assignment disk step by step each time the key 10 is actuated. To accomplish this I have provided a rock frame 35 which is pivoted as at 36—36 to the main frame. Extending downwardly from the frame 35 are a plurality of links 37 each adapted to encircle the auxiliary key levers 11 whereby the frame 35 is drawn down as each lever 11 is actuated, the frame 35 being held in its upper position by a spring 35'. The links 37 which are not being actuated are guided by pins 37'. Connected to the rock frame 35 is a contact member 38 which contacts with a contact member 39 carried upon the spring member 39'. As disclosed in Figs. 1 and 16 the magnets 31 are included in a circuit leading from a battery 40 connected to one side of the battery by wire 41 and by wire 42 leading from the other side of the battery 40 to a normally closed switch 43 thence by wire 44 to the switch comprising contacts 38 and 39 which is normally open, thence by wire 45 leading to the other side of the magnet 31. To reset the assignment disk 24 I preferably key a disk 46 to the shaft 22 provided with a notch 47 and adapted to register with the notch is a stop pawl 48 held normally out of engagement with the disk 46 by a member 49 controlled by the pivoted lever 50. It will be observed that the switch 43 is opened by the downward movement of the lever 50 breaking the main circuit controlling the magnet 31 of the assignment switch. Contact points 51 and 52 are brought together which closes a circuit between the battery 53 and the magnet 31 through wires 41—55, contact segments 51, contact bar 52, wire 56 to battery 53, wire 58, contact bar 7, segment 17, wires 57 and 54 to magnet 31 thus permitting the resetting of the assignment switches to normal position preferably by actuating key 10 bearing the numeral nine. When the assignment switch is in normal position the contact finger 32 is not in contact with any contact segment 25. This resetting may be done by means of any one of the actuating keys 10 preferably that carrying numeral nine.

As disclosed in Fig. 16 there may be as many registering units as desirable each being operated from the one keyboard. Each of said units is constructed as disclosed in Figs. 7 to 10, inclusive.

The numeral 60 indicates the base having vertical sidewalls 61—61. Extending transversely of the device is a shaft 62 secured to the vertical walls thereof. Independently journaled on said shaft are a plurality of rotatable registering disks 63, 64, 65 each tabulated on their periphery with several sets of numerals from zero to nine inclusive. The disks are provided with ratchet wheels 66, 67, 68 respectively. Arranged at the rear of the device are a plurality of armatures 69, 70, 71 actuated by the magnets 69', 70', 71' each of said armatures having a ratchet pawl 72 adapted to register with its receptive ratchet wheel. To prevent possible backward movement of the ratchet wheels while being revolved in their forward movement I preferably arrange at the rear of each of the ratchet wheels a stop pawl 73 pivoted by a transverse rod 74. In that it may be desirable to step the disks backwards at times, or rather subtract from the amount registered on any one disk I preferably provide each with a reverse ratchet wheel 75, 76, 77 respectively each of which is actuated by a reverse pawl 78 pivoted to a link 79 pivoted on a member 80 extending transversely of the device; the lower end of the pivoted member 79 is connected by a link 81 to its respective armature, the forward motion of which will impart reverse motion to its respective retarding disk. As a means for shifting the ratchet pawls 72 and 78 I provide a shifting key 82 pivoted as at 83 to the main frame. Connected to the rear end thereof is a vertically arranged push rod 84, the upper end of which is just short of contact with the under side of the ratchet pawl 72 which is raised away from the ratchet wheel 66 upon the downward movement of the shift key 82 against the pressure of spring 84'. Carried by the pawl 72 is a trigger 85' which is normally adapted to bear down on the rear portion 85 of the reverse pawl 78 which projects beyond the pivotal point thereof, keeping the reverse pawl 78 raised when the forward pawl 72 is lowered. As the latter is raised however the reverse pawl is released and allowed to drop into engagement with the reverse ratchet wheel. Attached to the push rod 84 is a laterally extending spring 86, the outer end of which is received between two pins 87'—87', serving to raise the forward stop pawl 73 and throwing the opposite end of the pawl 73 into engagement with its respective reverse ratchet wheel. Shift key 82 causes all reverse and forward pawls of a registering unit to be shifted simultaneously by means of a common transverse connection.

As stated the several registering units are independently mounted on the shaft 62, and it is desirable to step the adjacent registering disk ahead or backward one step when the disk to the right of it has been advanced ten points. To effect this each registering disk is provided with a plurality of laterally extending trip dogs 87, there being as many trip dogs as there are groups of numerals on the disk, in this case three in number. Arranged in the path of movement of these dogs is a pivoted contact member 88, which when raised by the dogs makes contact with contact members 89. As disclosed in Fig. 1 the contact member 89 actuated by the extreme right hand registering disk 65 is connected by a wire 89', leading to a battery 90 the opposite side of which is connected to the magnet 70' controlling the actuating pawls of the registering disk 64 the opposite side of the magnet 70' being connected to the contact member 88 by a wire 92, therefore the magnet 70' is energized each time the contact member controlled by the registering disk is closed, stepping the registering disk to the left thereof ahead or backward one point, according to the direction of the action of the pawls.

As a means for resetting the several registering disks I preferably provide a frame 93 pivoted as at 94 to the opposite sides of the main frame. Journaled in the frame 93 is a shaft 95, the outer end thereof being in the form of a crank 95'. Secured to the shaft 95 are a plurality of rollers 96, normally held out of engagement with the registering disk by a spring 97, the frame 93 bearing against stop 98 carried by the frame 98', pivoted as at 99 to the main frame, the outer end thereof being in the form of a handle 100 which when forced down serves to raise the frame 93 against the tension of the spring 97 bringing the rollers 96 into engagement with the several registering disks, whereby they may be rotated for resetting to zero. To insure the proper resetting of the registering disks I arrange a disk 101 for each registering disk, and provide in its periphery a plurality of notches 102 at positions which will cause a zero on each registering disk when normally at rest to show in the aperture provided in the cover. A purality of stop pawls 103 are pivotally mounted upon the rod 104, the former being held normally is a raised position by pressure on the rearward extension of pawl 103 by a pivoted member 105, pivoted to a rod 106 extending transversely across the machine, the member 105 normally being held down by a push rod 107 connected at its lower end to a transverse rod forming a part of the frame 98', the push rod 107 also serving to raise the pivoted member 105 and release the stop pawl 103 when the frame 98' is actuated to bring the resetting rolls 96 into operating position. This resetting is to be done when the shift lever 82 is in normal position, that is to say, free from contact with pawls 72.

As stated the several registering disks are adapted to be actuated by the one keyboard. As illustrated there are three registering disks, it being understood that any number may be used. There are as many disks on the assignment switch as there are registering disks in any one registering unit, in this case three, 19, 20, 21. In the diagram disclosed in Fig. 1 I have shown two of each which serve to illustrate the system. The assignment disk 19 is in contact with a contact finger 108 which in turn is connected by a wire 109 to one side of the magnet 69', leading from the other side of the magnet is a wire 110 connected to a wire 111 common to one side of all the magnets, which in turn leads to a switch contact 112 normally out of engagement with a contact member 113, thence by a wire 114 to one side of the battery 53, the opposite side of said battery 53 being connected by a wire 58 to the contact member 7 common to all of the contact segments 17, all of said contact segments being connected by their individual wires 57 to a common wire 115, through a switch 116, thence by wire 117 to the assignment switch contact member 32, thence to the contact segment 25, thence to the contact disk 19, thereby completing the circuit between the battery 53 and the magnet 69' which will receive as many impulses as there are contact segments 17 on the particular key 10 actuated. The second magnet 70' is connected by a wire 118 to the contact finger 119 of the assignment switch and by a wire 92 to the wire 111 thence to the battery 53 in the same manner as the magnet 69'. As disclosed in Fig. 1 there is interposed in the circuit between each registering unit and the keyboard a unit selecting switch, which is shown in detail in Figs. 11, 12, 13, preferably consisting of the following construction.

The numeral 121 indicates a base upon which is mounted two sets of magnets 122—123. Resiliently mounted upon each magnet are armatures 124 and 125, extending vertically from each armature are the contact members 126 and 127 adapted to contact with the stationary contact members 128, 129. Arranged centrally between the magnets is a pivoted circuit breaker 130 carrying a contact member 131 being held by means of a spring 130' in contact with a stationary contact 132. It is understood that there are as many armatures as there are sets of registering units, therefore only one complete circuit is disclosed in Fig. 1 which is as follows: 133 indicates a battery, one side of which is connected by a wire 134 to a stationary contact 132 thence to contact 131 carried by circuit breaker 130, thence by wire 135' to one side of the magnet 122, the opposite side of said magnet being connected by wire 122' to the contact member 126 carried by the armature 124 normally out of contact with the stationary contact 128, the latter being connected by wire 128' to the other side of the battery 133. If it is desirable to complete the circuit between the registering unit B and the keyboard the armature 124 is depressed causing the contact 112 to contact with the stationary contact 113 completing the circuit between the battery 53 and the magnets 69' and 70' of the registering unit B. Upon depressing the armature 124 contact members 126 and 128 are brought into contact closing the circuit between the battery 133 and the magnet 122 causing the armature to remain in its lower position until the circuit breaker 130 is actuated to break the last mentioned circuit.

Figure 14:
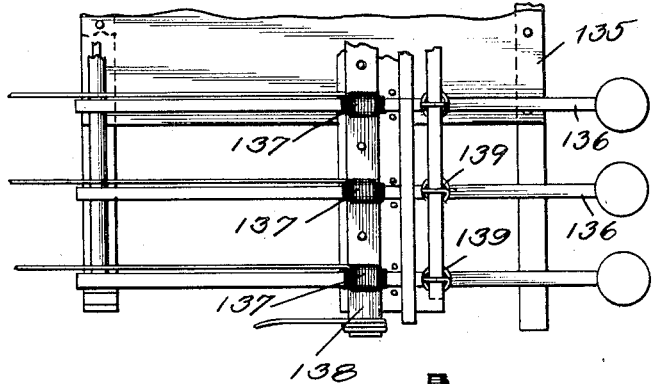
Fig. 14 is a plan view of the alternate assignment switch.
Figure 15:
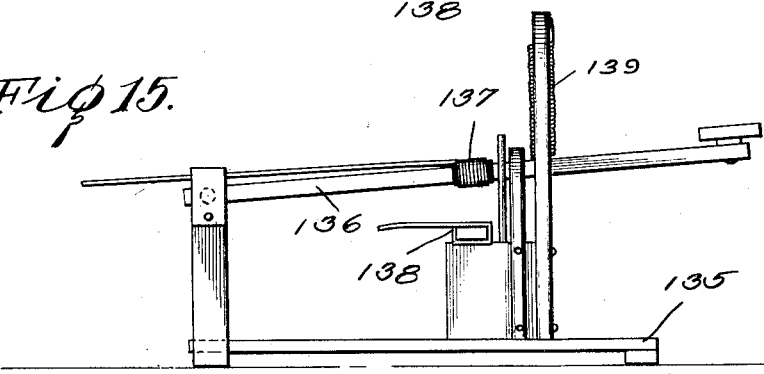
Fig. 15 is a side elevation thereof.

For the purpose of establishing a direct connection between a particular registering disk and the keyboard and rendering the assignment switch inoperative I preferably provide an independent set of switches as best disclosed in Figs. 14 and 15.

The numeral 135 indicates a base to which is pivotally mounted a plurality of pivoted levers 136, carrying a contact member 137 adapted to contact with a stationary contact member 138, said levers being held in their normal upper position by springs 139. As disclosed in Fig. 1 when the switch 116 is thrown into engagement with the contact 140 the circuit leading to the assignment contact 32 is broken and a circuit is established through the wire 141 leading to the stationary contact 138 and the contact 137 carried by the lever 136 when the latter is depressed, the latter being connected by wires 142—109 to the magnet 69' permitting the latter to be energized by the actuation of any one of the keys 10 of the keyboard in the manner described hereinbefore.

Figure 1:
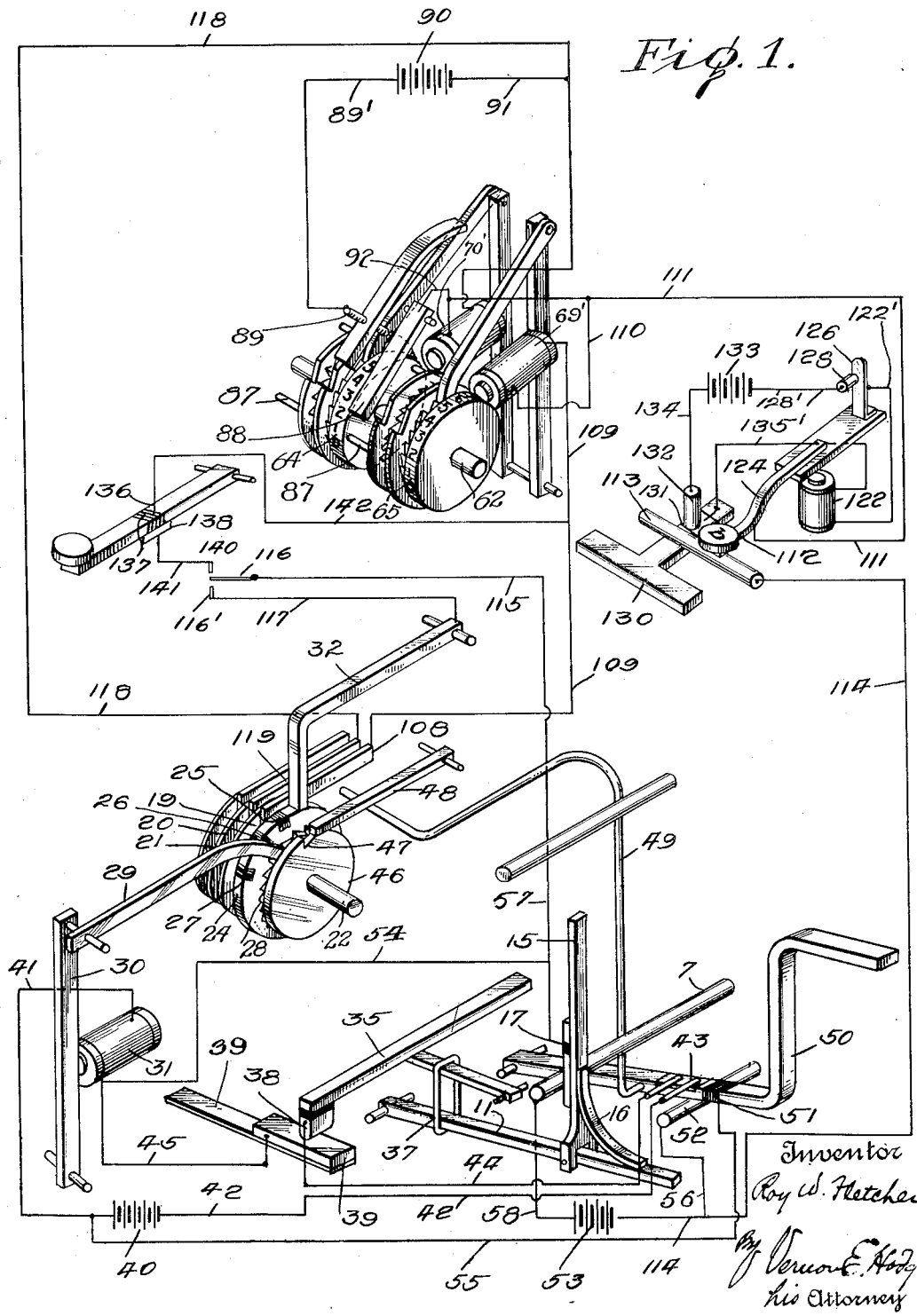
Figure 1 is a diagram of connections showing parts of the machine in perspective.
Figure 3:
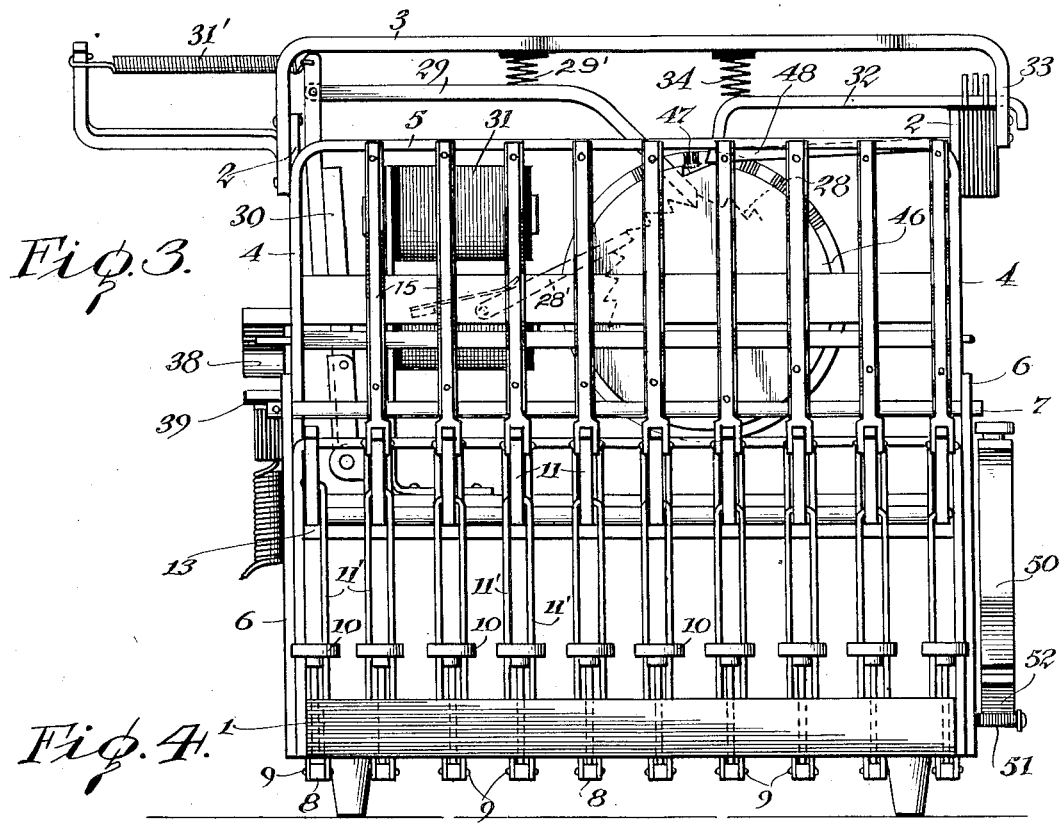
Fig. 3 is a front view thereof.
Figure 4:
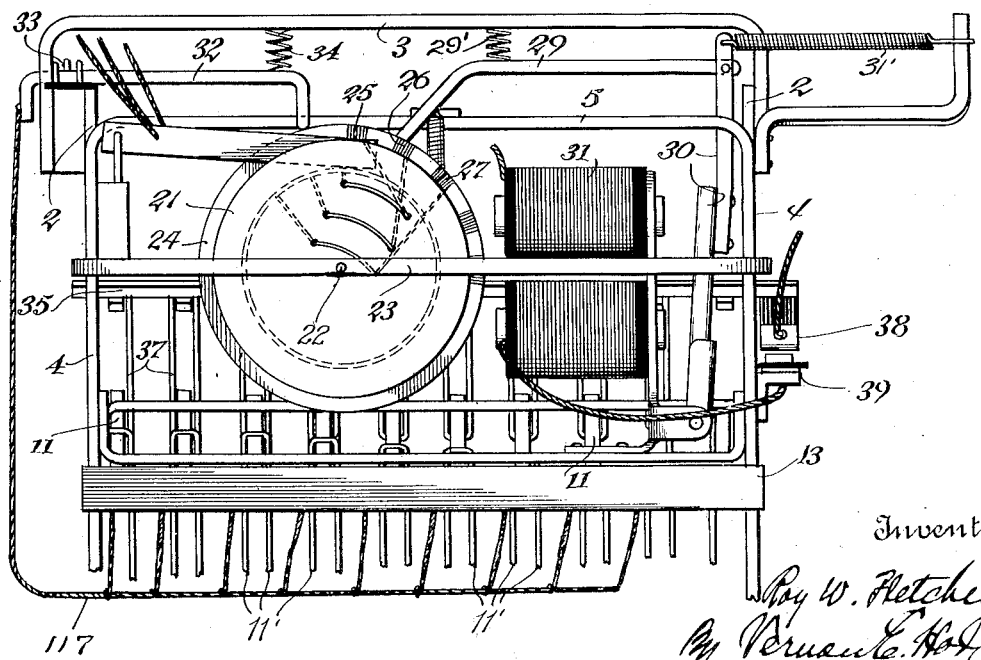
Fig. 4 is a rear view of the upper portion of the registering keyboard showing the assignment switch.
Figure 5:
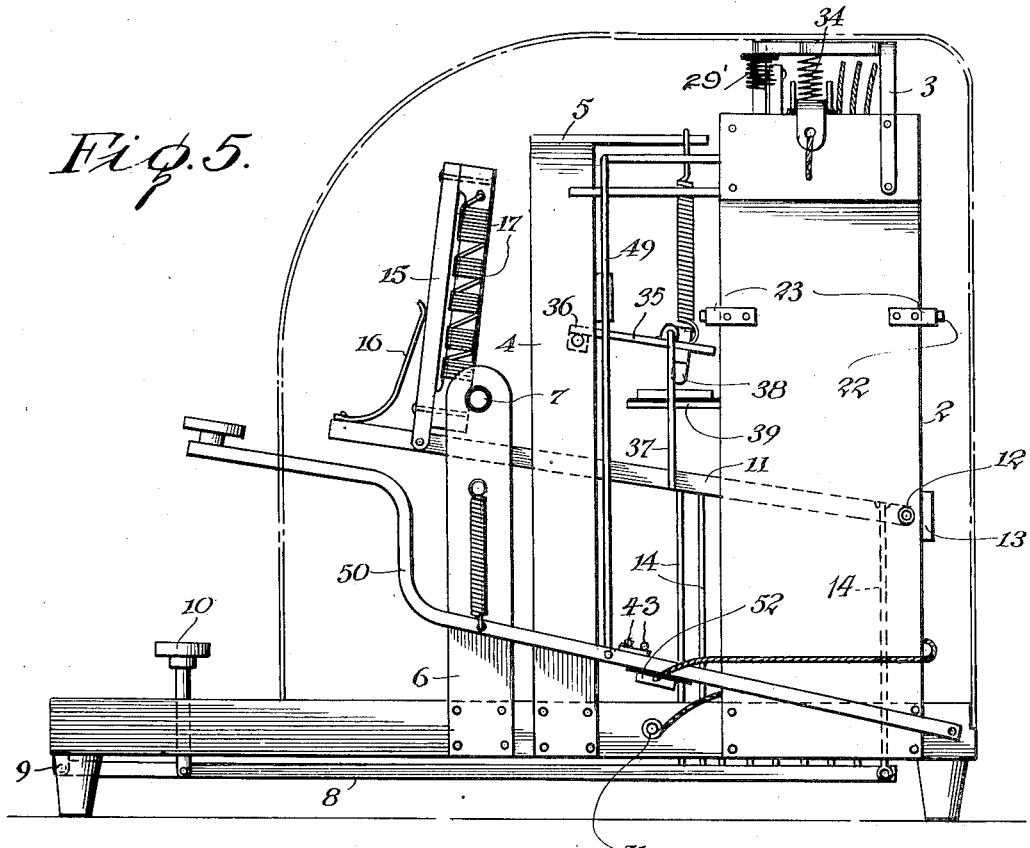
Fig. 5 is a side elevation of the registering device looking in the opposite direction from Fig. 2.

*Operation.*—Referring to Fig. 1, primarily the selecting armature 124 is depressed, the contact members 126 and 128 are brought together completing the circuit between battery 133 and the magnet 122, through the wire 134 leading from one side of the battery to contact 132, contact 131 circuit breaker 130, wire 135', magnet 122, wire 122', contact member 126 carried by the selecting armature 124 and the contact 128 thence by wire 128' to the other side of the battery 133.

Upon depressing any one of the actuating keys 10, say the one designated by the numeral one, the corresponding auxiliary lever 11 is depressed, immediately the rock frame 35 is depressed, causing the contact members 38 and 39 to be brought into engagement, closing the circuit between the battery 40 and the magnet 31, through wire 42, switch 43, wires 44 and 45, magnet 31, wire 41 and battery 40 thus attracting the armature 30, the ratchet pawl 29 stepping the assignment switch head one notch, completing a circuit between the assignment contact finger 32, the segment contact 25, the contact disk 19 and the contact finger 108, completing the circuit at this point. Immediately thereafter the contact finger 15 of the auxiliary lever 11 in moving downwardly brings the contact segment 17 into contact with the stationary contact bar 7, completing the following circuit between the battery 53 and the magnet 69', from one side of the battery 53 through wire 58 to stationary bar 7, contact 17 carried by contact finger 15, wires 57 and 115, through switch 116, contact 116', wire 117, assignment finger 32, segment 25, contact disk 19, contact finger 108, wire 109 to one side of magnet 69', thence through wires 110—111 to contact 112, carried by selecting armature 124, stationary member 113, and wire 114 to the opposite side of battery 53.

In Fig. 17 I have shown a modified form of assignment switch which preferably consists of the following construction.

The numeral 145 indicates a base upon which is mounted a ratchet bar 146 horizontally slidable in suitable guideways 147, the bar 146 is provided on its upper and lower edges with ratchet teeth 148 and 149, the upper ones being in advance of the lower ones. Engaging the upper teeth is a ratchet pawl 150 pivoted as at 151 to the base 145, The numeral 152 indicates a similar ratchet pawl pivoted as at 153, to the base 145, adapted to engage the lower ratchet teeth 149 of the ratchet bar 146. Normally the ratchet pawl 152 is held in engagement with the sliding ratchet bar by a spring 154 and ratchet pawl 150 is held free from contact with ratchet bar 146 by the upward pull of spring 155' on pivoted arm 155, but in operation the upper ratchet pawl 150 comes into engagement with the upper ratchet teeth 148 when pivoted arm 155, which is secured to the rock frame 35, is actuated by the registering keyboard 10. Carried by the ratchet bar 146 is a contact finger 156 which is adapted to register with a plurality of segments 157, 158, 159 carried by a bar 160 pivoted at 161 to the base 145 and held normally against the contact fingers 156 by a spring 162. Segments 157, 158 and 159 are equivalent to the contact disks 19, 20, 21 of the assignment switch and the contact finger 156 is equivalent to the contact finger 32. When any one of the registering keys 10 is depressed the pivoted arm 155 is lowered and the ratchet pawl 150 is let down upon the ratchet bar 146, but not into registry with the ratchet teeth 148, the lower ratchet pawl at this instance holding the ratchet bar 146 against movement by the spring 163. As the rock arm 155 descends the lower ratchet pawl 152 is forced out of engagement with the ratchet bar 146 permitting the bar to advance one notch causing the contact finger 156 to register with the segment 157, closing a circuit similar to the circuit controlled by the contact disk 19 and the finger 108 as described, this contact member 156 being advanced step by step as the keys 10 are actuated, thereby automatically connecting the proper registering disk at the proper time with the keyboard.

To reset to normal after registering a complete amount the contact finger 156 is shifted to extreme position against the tension of spring 163.

It is contemplated that the shifting of reverse pawls 78 and forward pawls 72 in each registering unit in service will be done simultaneously by depressing a master key suitably connected with the shift keys 82 of each registering unit.

The normal method of registering amounts will be from right to left, that is to say, first register the numeral in the units position and then that in tens position, and so on within the capacity of the registering unit. The reason for this is apparent in that the assignment switch makes the electrical connection with the dials of the registering units progressively from right to left. The alternate assignment ratchet has been designed to make possible a promiscuous selection of dials. When this means is employed, the regular assignment switch has been first thrown out of circuit.

I claim:

1. The combination of a keyboard, a plurality of independent registering units, and a unit selecting switch in electrical circuit with the registering units and with the keyboard for selecting any of said registering units and connecting the selected unit or units with the keyboard to be actuated thereby.

2. The combination of a keyboard, a plurality of independent registering units having registering disks therein, a unit selecting switch in electrical circuit with the independent registering units and with the keyboard for selecting any one of said registering units and connecting said selected unit with the keyboard to be actuated therefrom, and a disk selecting means in electrical circuit with the registering disk operating means and with the keyboard.

3. The combination of a keyboard, a plurality of registering disks, a disk selecting means, an electrically actuated pawl and ratchet means for actuating the selecting means, the selecting means having an electrical connection with the keyboard and with the registering disks.

4. The combination of a keyboard, a plurality of registering disks, a disk selecting means, an alternate disk selecting means, and means for connecting either of the selecting means with the registering disks and with the keyboard.

5. The combination of a keyboard, a plurality of registering disks, a disk selecting means, an alternate disk selecting means, a switch for connecting the keyboard with either of the selecting means, and means for connecting the selecting means with the registering disks.

6. The combination of a keyboard, a plurality of registering units, and a unit selecting switch in electrical circuit with the registering units and with the keyboard for selecting any one of the registering units.

7. The combination of a keyboard, a plurality of registering units, and a unit selecting switch comprising a plurality of keys, each key being connected with the corresponding registering unit, and in circuit therewith and with the keyboard.

8. The combination of a keyboard, a plurality of registering units, a unit selecting switch comprising a plurality of keys, each key being connected with the corresponding registering unit, and in circuit therewith and with the keyboard, and a circuit breaker for breaking said circuit.

9. The combination of a keyboard, a plurality of registering units, a unit selecting switch comprising a plurality of keys, each key being in circuit with the corresponding registering unit and with the keyboard, and a circuit breaker for breaking said circuit.

10. In combination a registering unit consisting of a plurality of registering disks mounted for rotation therein, a ratchet disk fixed to each of said registering disks, electrically actuated pawls engaging said ratchet disks, a registering keyboard, a plurality of contact segments actuated thereby, a disk selecting means interposed in the circuit between the disk actuating means and a source of power, an electrically actuated pawl and ratchet means for actuating said selecting means, a circuit closing means actuated by said keyboard for closing the circuit between the electrically actuated pawl and ratchet actuating means, and a source of power, whereby upon the movement of any one of the keys of the keyboard, a circuit is completed between the disk actuating means and source of power, and the disk selecting actuating means and a source of supply.

11. In combination a registering unit consisting of a plurality of registering disks mounted for rotation therein, a ratchet disk fixed to each of said registering disks, electrically actuated ratchet pawls engaging said ratchet disks, a registering keyboard, a plurality of contact segments actuated thereby, a disk selecting means interposed in the circuit between the disk actuating means and source of power, an electrically actuated pawl and ratchet means for actuating said selecting means, a circuit closing means actuated by said keyboard for closing the circuit between the electrically actuated pawl and ratchet actuating means, and a source of power, whereby upon the movement of any one of the keys of the keyboard a circuit is completed between the disk actuating means and source of power, and the disk selecting actuating means and a source of power and means for breaking the circuit between the selecting disk actuating means and its source of power and establishing a circuit between the selecting means and the keyboard whereby the selecting means may be reset by the keyboard.

12. In combination a plurality of registering units each consisting of a plurality of registering disks mounted for rotation therein, a ratchet disk fixed to each of said registering disks, electrically actuated ratchet pawls engaging said ratchet disks, a registering keyboard, a plurality of contact segments actuated thereby, a disk selecting means interposed in the circuit between the disk actuating means and a source of power, an electrically actuated pawl and ratchet means for actuating said selecting means, a circuit closing means actuated by said keyboard for closing the circuit between the electrically actuated pawl and ratchet actuating means, and a source of power, whereby upon the movement of any one of the keys of the keyboard, a circuit is completed between the disk actuating means and source of power, and the disk selecting actuating means and a source of power and means interposed in the circuit between the plurality of registering units and the master keyboard for selecting any one of the units for registration.

13. In combination a registering unit, a plurality of registering disks mounted for rotation therein, electrical actuating means for each of said registering disks, a registering keyboard, a plurality of contact segments actuated thereby and arranged in a circuit between the registering disks and a source of power, a disk selecting means, consisting of a plurality of rotary disks, and contact fingers in engagement therewith and in circuit with the respective disk actuating means, a disk provided with a plurality of segments in circuit with said rotary selecting disks, a contact finger adapted to engage said rotary segment disks, the latter in circuit with said keyboard contact segments, an electrical actuating means adapted to impart a step by step movement to said selecting disk, a circuit closing means actuated by the movement of any one of the keys of the keyboard, so arranged that upon the movement of one of the keys of the keyboard a particular registering disk is placed in circuit with a source of power and advanced ahead according to the number of segments on the particular key actuated.

14. In combination a plurality of registering units each consisting of a plurality of registering disks mounted for rotation therein, electrical actuating means for each of said registering disks, a registering keyboard, a plurality of contact segments actuated thereby and arranged in a circuit between the registering disks and a source of power, a disk selecting means, consisting of a plurality of rotary disks, and contact fingers in engagement therewith and in circuit with the respective registering disk actuating means, a disk provided with a plurality of segments in circuit with said rotary selecting disks, a contact finger adapted to engage said rotary segment disks, the latter in circuit with said keyboard contact segments, an electrical actuating means adapted to impart a step by step movement to said selecting disk, a circuit closing means actuated by the movement of any one of the keys of the keyboard, so arranged that upon the movement of one of the keys of the keyboard a particular registering unit is placed in circuit with a source of power and advanced ahead according to the number of segments on the particular key actuated and means for selecting the particular unit upon which the registry is to be made.

15. In combination a registering unit consisting of a plurality of registering disks mounted for rotation therein, a ratchet disk secured to each of said disks, electrically actuated pawls adapted to engage said ratchet disks, upper and lower contact members adapted to be moved into contact with each other by the rotation of said registering disks, said contact members being in circuit with the electrically actuated pawls of the adjacent disk, trip dogs connected with the registering disks and adapted to close the contact members of the adjacent registering disk whereby the adjacent registering disk is advanced one step upon the rotation of a predetermined number of steps of the registering disk, a keyboard, and circuit closing means actuated thereby and in circuit with the disk actuating means whereby the said registering disks are advanced step by step consecutively as the keys of the keyboard are actuated.

16. In an adding machine, a plurality of registering disks, a disk selecting means comprising an assignment disk having a plurality of contacts thereon, means for rotating the assignment disk, and a contact finger adapted to engage one of the contacts.

17. In an adding machine, a plurality of registering disks, a disk selecting means comprising an assignment disk having a plurality of contacts thereon, a plurality of contact disks, each of which is connected with one of said contacts, and a contact finger adapted to engage one of the contacts for closing a circuit through the registering disks.

18. In an adding machine, a plurality of registering disks, a disk selecting means, comprising an assignment disk having a plurality of contacts thereon, a plurality of contact disks adjacent the assignment disk, each of the contact disks being connected with one of the contacts, a contact finger in position to engage one of the contacts for closing a circuit through the registering disks, a ratchet wheel connected with the assignment disk, and an electrically actuated pawl in position to rotate the ratchet wheel and assignment disk.

19. In an adding machine, a plurality of registering disks, ratchet wheels connected therewith, electrically actuated pawls for rotating the ratchet wheels and disks in one direction and electrically actuated reverse pawls for rotating the ratchet wheels in a reverse direction, said reverse pawls having projections in position to be engaged by projections on the first-mentioned pawls for moving one set of pawls out of engagement with the ratchet wheels as the other set is moved into engagement therewith.

20. In an adding machine, a plurality of registering disks, ratchet wheels connected therewith, electrically actuated pawls for rotating the ratchet wheels and disks in one direction, said pawls having outwardly projecting triggers, reverse pawls for rotating the ratchet wheels in a reverse direction, said reverse pawls having outwardly extending projections in position to be engaged by the triggers to be moved thereby out of engagement with the ratchet wheels, and means for moving the first-mentioned pawls out of engagement with the ratchet wheels to permit the reverse pawls to be moved into engagement therewith.

21. In an adding machine, the combination of a plurality of registering disks, ratchet wheels connected therewith, electrically-actuated pawls for rotating the ratchet-wheels and disks in one direction, said pawls each having outwardly-projecting triggers, reverse pawls connected with and operated by said triggers for rotating the ratchet-wheels in a reverse direction, said reverse pawls having outwardly-extending projections in position to be engaged by the triggers to be moved thereby out of engagement with the ratchet-wheels, said first-mentioned pawls being normally in engagement with the ratchet-wheels, and the reverse pawls being normally out of engagement with the ratchet-wheels, and means in position to engage the first-mentioned pawls for moving said pawls out of engagement with the ratchet-wheels and for permitting the reverse pawls to be moved into engagement therewith.

22. In an adding machine, a plurality of registering disks, a keyboard including a plurality of key levers, a plurality of auxiliary levers in position to be actuated thereby, and circuit closing means connected with the auxiliary levers adapted to close a circuit for causing the disks to rotate.

23. In an adding machine, a plurality of registering disks, a keyboard comprising a plurality of key levers, a plurality of auxiliary levers arranged thereabove and operated thereby, contact fingers connected with the auxiliary levers, and a contact bar adapted to close a circuit for causing the disks to rotate.

24. In an adding machine, a plurality of registering disks, a keyboard comprising a plurality of key levers, a plurality of auxiliary levers arranged thereabove and operated thereby, contact fingers connected with the auxiliary levers, contact segments connected with the fingers, and a contact bar adapted to close a circuit for causing the disks to rotate.

25. In an adding machine, a plurality of registering disks, means for rotating the disks, a keyboard comprising a plurality of key levers, a plurality of auxiliary levers arranged thereabove and operated thereby, contact fingers connected with the auxiliary levers, contact segments connected with the fingers, a contact bar adapted to engage the contact segments and close a circuit between the disk actuating means and a source of power.

26. The combination of a keyboard, a plurality of independent registering units having registering disks therein, a unit selecting switch in electrical circuit with the independent registering units, for selecting any one of said registering units and connecting said selected unit in electrical circuit with the keyboard to be actuated therefrom.

27. In an adding machine, the combination of a keyboard a plurality of registering units, a unit selecting switch including a plurality of keys in electrical circuit with the corresponding registering units, and with the keyboard, means for holding the keys in circuit with the registering units and keyboard, and means for breaking said circuit.

28. In an adding machine, the combination of a keyboard, a plurality of registering units, a unit selecting switch including a plurality of keys in electrical circuit with the corresponding registering units and with the keyboard, electrically actuated means for holding the keys in circuit with the registering units and keyboard, and a manually operated circuit breaker for breaking said circuit.

29. In an adding machine, the combination of a keyboard, a plurality of registering disks, and a disk selecting means including an assignment disk having a plurality of contacts thereon, said contacts being connected with the registering disks, and electrical intermittently actuated means for connecting the contacts with the keyboard for actuating the registering disks therefrom.

30. In an adding machine, the combination of a keyboard, a plurality of registering disks, means for actuating said disks, and a disk selecting means including an assignment disk having a plurality of contacts thereon, said contacts being in an electrical circuit with the disk actuating means, and electrical intermittently actuated means for connecting the contacts with the keyboard for controlling the disk actuating means therefrom.

31. In an adding machine, the combination of a keyboard, a plurality of registering disks, means for actuating said disks, and a disk selecting means including an assignment disk having a plurality of contacts thereon, a plurality of contact disks adjacent the assignment disk and connected with the contacts thereon, and a contact finger in position to engage a contact on the assignment disk for closing a circuit through the registering disk actuating means and the keyboard.

32. In an adding machine, the combination of a plurality of registering disks, means for actuating said disks, a disk selecting means, including an assignment disk having a plurality of contacts thereon, said contacts being in circuit with the registering disk actuating means, and a contact finger in position to engage a contact on the assignment disk for closing a circuit through the registering disk actuating means and the keyboard.

33. In an adding machine, the combination of a plurality of registering disks, a disk selecting means including an assignment disk having a plurality of contacts thereon, a contact finger in position to engage a contact on the assignment disk, and electrical intermittently actuated means for moving the contact and contact finger into engagement.

34. In an adding machine, the combination of a plurality of registering disks, a keyboard including a plurality of key levers, a plurality of auxiliary levers in position to be operated thereby, a plurality of contacts carried by the auxiliary levers, and a contact bar in position to be engaged with the contacts for closing a circuit causing the disks to rotate.

35. In an adding machine, the combination of a plurality of registering disks, a keyboard including a plurality of key levers, a plurality of auxiliary levers in position to be operated thereby, contact fingers carried by the auxiliary levers, contact segments carried by the contact fingers, and means for engaging the segments for closing a circuit causing the disks to rotate.

36. In an adding machine, the combination of registering means, a plurality of actuating levers, contact fingers connected with said levers, contact segments connected with the contact fingers, and means for engaging the segments for closing a circuit actuating the registering means.

37. In an adding machine, the combination of registering means, a plurality of actuating levers, contact fingers carried by said levers, contact segments carried by the contact fingers and a contact bar adapted to engage the segments for closing a circuit for actuating the registering means.

In testimony whereof I affix my signature.

ROY W. FLETCHER.